(12) United States Patent
Yukawa et al.

(10) Patent No.: US 7,693,631 B2
(45) Date of Patent: Apr. 6, 2010

(54) HUMAN MACHINE INTERFACE SYSTEM FOR AUTOMOTIVE APPLICATION

(75) Inventors: Junichi Yukawa, Farmington Hills, MI (US); Hongxing Hu, West Bloomfield, MI (US); Katsuya Saito, West Bloomfield, MI (US)

(73) Assignee: Panasonic Corporation, Osaka (JP)

( * ) Notice: Subject to any disclaimer, the term of this patent is extended or adjusted under 35 U.S.C. 154(b) by 13 days.

(21) Appl. No.: 11/970,118

(22) Filed: Jan. 7, 2008

(65) Prior Publication Data

US 2008/0109132 A1    May 8, 2008

Related U.S. Application Data

(62) Division of application No. 11/119,402, filed on Apr. 29, 2005.

(60) Provisional application No. 60/669,951, filed on Apr. 8, 2005.

(51) Int. Cl.
G01C 21/30 (2006.01)
(52) U.S. Cl. ......................................... 701/36; 345/156
(58) Field of Classification Search ............. 701/29–43, 701/51; 345/326, 349, 970
See application file for complete search history.

(56) References Cited

U.S. PATENT DOCUMENTS

| | | | |
|---|---|---|---|
| 4,818,048 A | 4/1989 | Moss | |
| 5,050,937 A * | 9/1991 | Eccleston | ...................... 303/7 |
| 5,463,696 A | 10/1995 | Beernink et al. | |
| 5,808,374 A | 9/1998 | Miller et al. | |
| 5,847,704 A | 12/1998 | Hartman | |
| 5,864,105 A | 1/1999 | Andrews | |
| 5,903,229 A | 5/1999 | Kishi | |
| 5,963,890 A | 10/1999 | Sarbach | |
| 6,157,372 A | 12/2000 | Blackburn et al. | |
| 6,275,231 B1 * | 8/2001 | Obradovich | ................. 345/156 |
| 6,476,794 B1 | 11/2002 | Kataoka et al. | |
| 6,697,721 B2 | 2/2004 | Arlinsky | |
| 6,738,514 B1 | 5/2004 | Shin et al. | |
| 6,819,990 B2 | 11/2004 | Ichinose | |
| 6,842,677 B2 | 1/2005 | Pathare | |

(Continued)

FOREIGN PATENT DOCUMENTS

DE           10039432           12/2001

(Continued)

OTHER PUBLICATIONS

Enderby, C.M., et al., "Head-Up Display in Automotive/Aircraft Application," SAE Technical Paper Series (920740), International Congress & Exposition, Detroit, MI, Feb. 24-28, 1992, pp. 39-48.

(Continued)

*Primary Examiner*—Richard M. Camby
(74) *Attorney, Agent, or Firm*—Harness, Dickey & Pierce, P.L.C.

(57) ABSTRACT

An integrated control interface is provided for the driver of the vehicle. The control interface employs a plurality of multi-functional switches located proximate to the driver in combination with a display that provides an indicia of the vehicle function controlled by each switch. A control module receives control signals from the switches and initiates control of the applicable vehicle subsystem function in response thereto.

15 Claims, 9 Drawing Sheets

U.S. PATENT DOCUMENTS

| | | | |
|---|---|---|---|
| 7,126,583 | B1 | 10/2006 | Breed |
| 2004/0030807 | A1* | 2/2004 | Wessler et al. .................. 710/1 |
| 2004/0234129 | A1 | 11/2004 | Sparr et al. |
| 2004/0240739 | A1 | 12/2004 | Chang et al. |

FOREIGN PATENT DOCUMENTS

| | | |
|---|---|---|
| WO | WO 01/45080 | 6/2001 |

OTHER PUBLICATIONS

Frank, R., "Hands on the Wheel, Eyes on the Road, Mind on the Drive," Ward's Auto Electronics, May 2005, 7 page printout.

Green, P., et al., "Future In-Car Information Systems: Input from Focus Groups," SAE Technical Paper Series (920614), International Congress & Exposition, Detroit, MI, Feb. 24-28, 1992, 10 page printout.

Greenland, A.R, et al., Delco Electronics Corp., "Head Up Display Concepts for Commercial Trucks," SAE Technical Paper Series (911681), Future Transportation Technology Conference and Exposition, Portland, OR, Aug. 5-7, 1991, 7 page printout.

Itoh, K., et al., Nissan Motor Co., Ltd., "Evaluation of a Voice-Activated System Using a Driving Simulator," (2004-01-0232) Copyright 2004 SAE International, pp. 1-6.

Kamiya, N., et al., "Development and Evaluation of a Multi-Functional Steering Wheel Switch," Tokai Rika Co., Ltd. (2005-01-0424), Copyright 2005 SAE International, pp. 13-20.

Knoll, P.M., et al., "Human-Machine Interface: How to Make it Simple & Effective," SAE Technical Paper Series (2000-01-C019), Convergence 2000 International Congress on Transportation Electronics, Detroit, MI, Oct. 16-18, 1999, 10 page printout.

Murray, C.J., "Head-Up Displays Get Second Glance," EETimes, www.eetimes.com/article/printableArticle.jhtml, Jan. 5, 2004, 4 page printout.

Stringfellow, S.A., Lead Staff Engineer, Displays and Controls Group, General Motors Corporation, "GM Head Up Displays: The Market, The Requirements and the Technologies," SID Vehicle Display 2001 Symposium, Oct. 15, 2001, 23 page printout.

\* cited by examiner

HUMAN MACHINE INTERFACE SYSTEM FOR AUTOMOTIVE APPLICATION

This application is a divisional of U.S. patent application Ser. No. 11/119,402 filed on Apr. 29, 2005. This application claims the benefit of U.S. Provisional Application No. 60/669,951, filed on Apr. 8, 2005. The disclosure of the above applications is incorporated herein by reference.

FIELD OF THE INVENTION

The present invention relates to human machine interfaces and, more particularly, to an improved control interface for a driver of a vehicle.

BACKGROUND OF THE INVENTION

A driver of a vehicle may be required to control a variety of different systems within the vehicle. Exemplary systems requiring input from the driver may include a climate control system, an audio system, a navigation system, and an external communication system. The driver interacts with one or more input mechanisms associated with each system to control the operation thereof. To simplify operation, a separate input mechanism is preferably employed for each controllable feature. For instance, the audio system may have different dedicated inputs for selecting an input source, controlling the volume, adjusting other audio characteristics, etc. With an increased complexity of such systems as well as an increase in the number of such systems in the vehicle, a driver may be required to operate a multitude of inputs. As a result, the driver may encounter difficulty controlling these systems while safely driving the vehicle.

Therefore, it is desirable to provide an improved control interface for the driver of a vehicle.

SUMMARY OF THE INVENTION

In one aspect of the present invention, an integrated control interface is provided for the driver of the vehicle. The control interface employs a plurality of multi-functional switches located proximate to the driver in combination with a display that provides an indicia of the vehicle subsystem function controlled by each switch. A control module receives control signals from the switches and initiates control of the applicable vehicle subsystem function in response thereto.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

Figure 1:
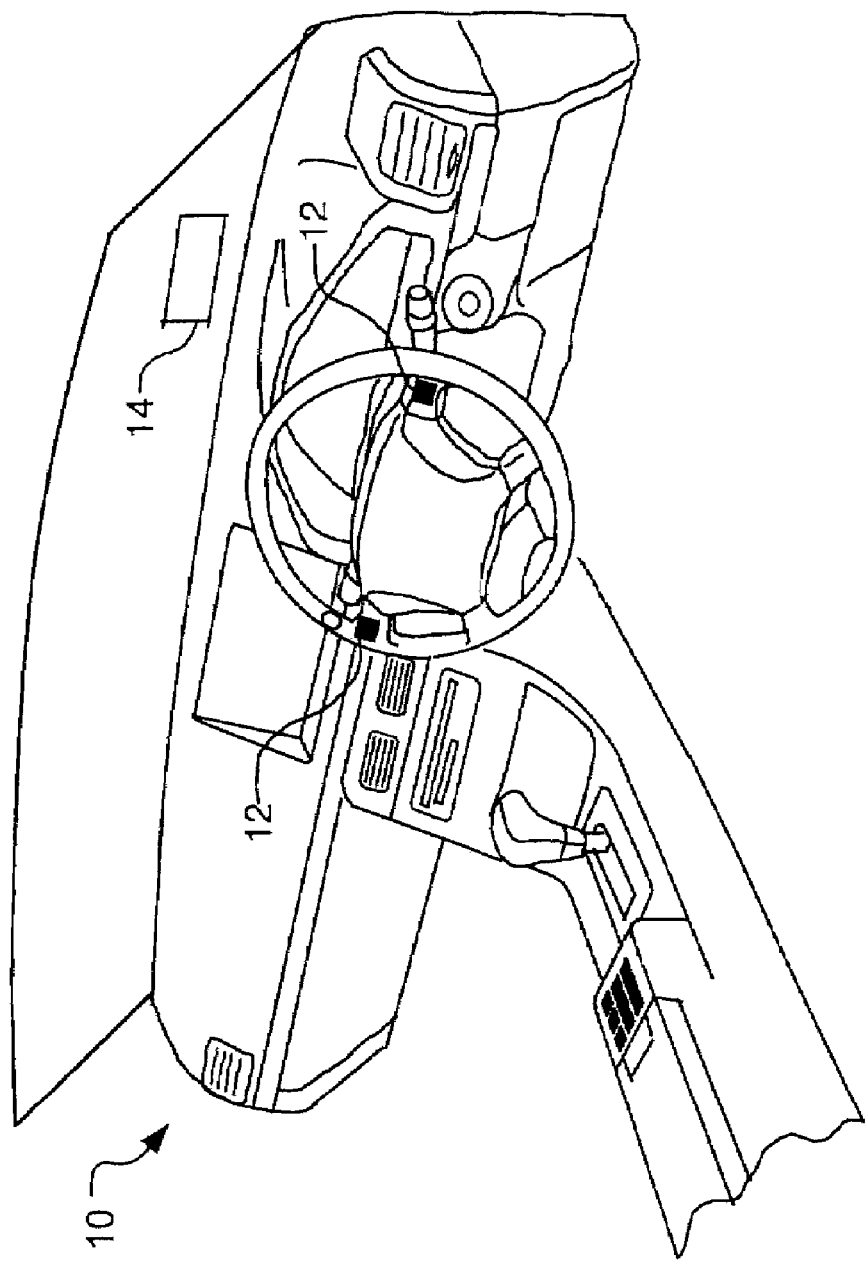
FIG. 1 is a diagram of an improved control interface system according to the principles of the present invention in the context of an automotive application.

FIG. 1 illustrates an improved control interface system 10 according to the principles of the present invention in the context of an automotive application. The control interface system 10 combines at least one multi-functional switch 12 located proximate to the driver of the vehicle in combination with a display image 14 projected into a field of view of the driver. The control interface system 10 further includes a control module which receives control signals from the switches 12 and initiates control of the applicable vehicle subsystem functions in response thereto. Such on-board subsystems include, for example, audio system, climate control system, navigation system, and external communication systems. While the following description is provided with reference to an automobile, it is readily understood that the control interface system 10 of the present invention is suitable for use in other types of vehicles, including but not limited to airplanes, trains, boats and spacecrafts.

In operation, each switch 12 is able to generate control signals for different vehicle subsystem functions and the display image 14 provides an indicia for which vehicle function is currently controlled by each switch 12. Through the use of multi-functional switches 12, the control interface system 10 of the present invention is able to reduce the number of switches 12 needed to control the different systems residing in the vehicle. In addition, by placing the display image 14 in the field of view of the driver, a driver is able to actuate the correct switches 12 without redirecting their line of sight from the road, thereby providing a safer vehicle operating environment. However, it is also envisioned that the control interface system of the present invention may also be employed by other passengers in the vehicle, including those in rear seating locations. In these instances, requisite switches and displays would be located proximate to the applicable passengers.

Figure 2:
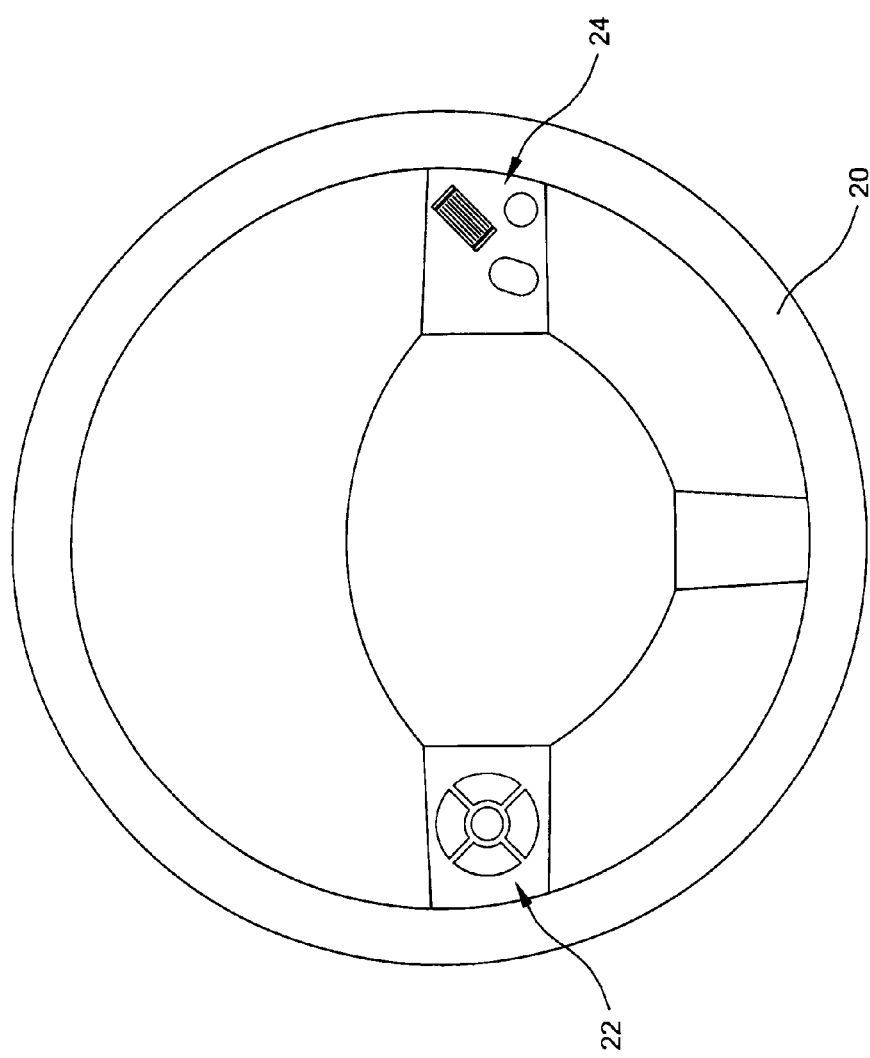
FIG. 2 is a diagram of a steering wheel illustrating an exemplary switch configuration in accordance with the present invention.

An exemplary embodiment of a control interface system 10 in accordance with the present invention is further described below. In this exemplary embodiment, the multi-functional switches 12 are embedded in the steering wheel 20 of the vehicle as shown in FIG. 2. In particular, the control interface system 10 employs two switch clusters, each having a plurality of switches. A first set of function selection switches 22 are disposed on the left side of the wheel; whereas, a second set of switches 24 is disposed on the right side of the wheel. It is understood that the switch clusters may be placed at other locations proximate to the driver, such as in a shift lever, center console or other easily reachable locations.

Figure 3:
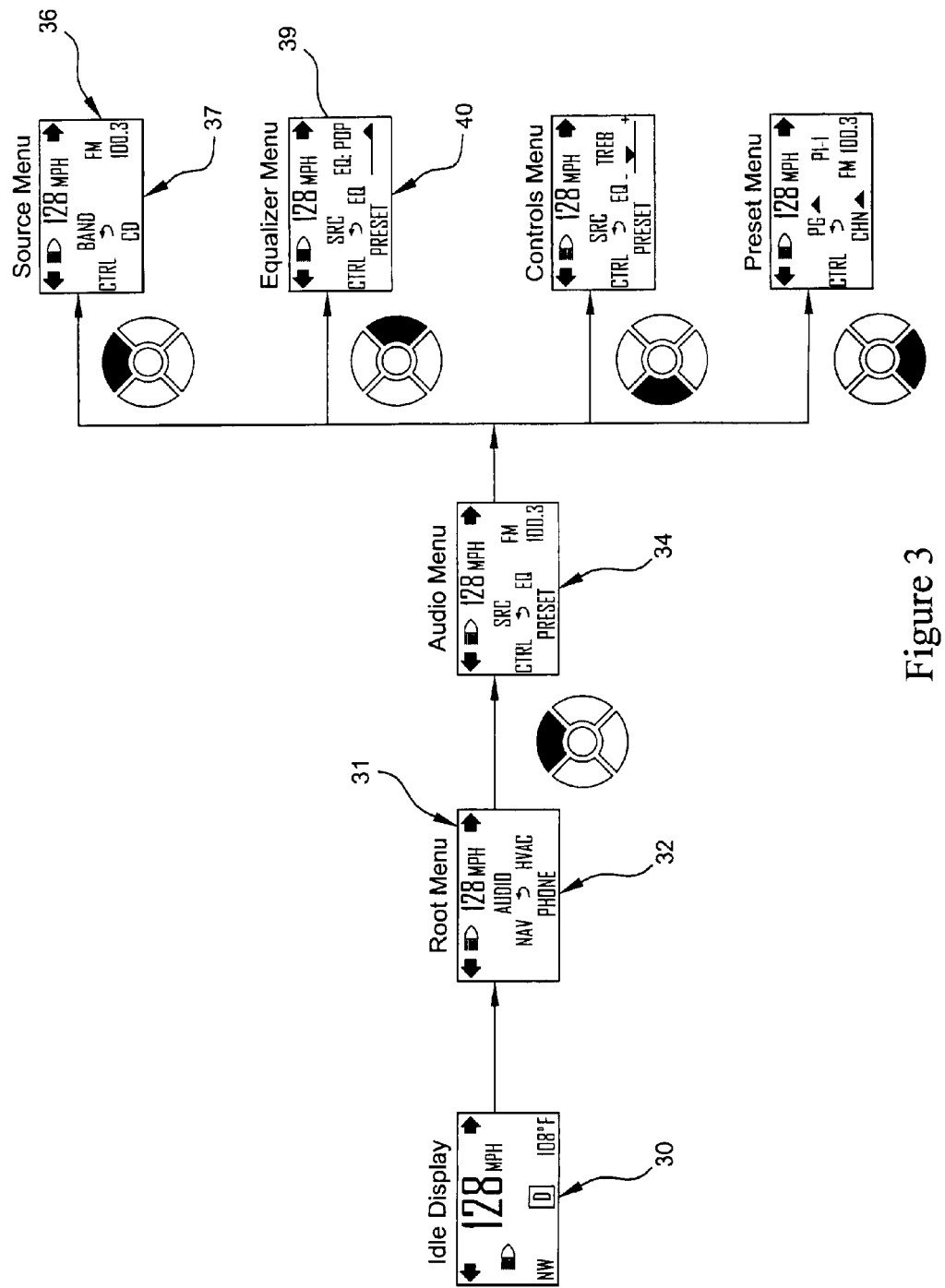
FIG. 3 illustrates exemplary display images as a driver navigates through a menu in accordance with the present invention.

FIG. 3 illustrates an exemplary display image 30 projected into a field of view of the driver. The display image 30 may include various operational information such as the speed and direction the vehicle is traveling, the external air temperature as well as other information which may be of interest to the driver of the vehicle. Although the display image 30 is preferably projected onto the front windshield of the vehicle by a heads-up display device, it is envisioned that the display image 30 may be projected to other locations and other types of display devices may be suitable for the present invention. For instance, a VFD or LCD display device may be disposed in the dashboard, on top of the dashboard or in a center console.

In operation, the function selection switches 22 are used to navigate a menu of available vehicle subsystem functions. By pressing any of the function selection switches 22, a root menu 32 is displayed on the display image indicated at 31. The root menu includes an indicia for each of the currently selectable menu items. In this example, an indicia is provided for each of the vehicle subsystems which may be controlled through the control interface system 10 as well as an indicia for returning to the previous menu. As shown, an indicia is provided for an audio system, a climate control system, a phone system and a navigation system 36. It is readily understood that the control interface may be employed for other types of applications, such as satellite radio, portable hard disk drive audio, and a rear seat entertainment system.

Each of the menu items further correlates to one of the function selection switches. By depressing an applicable switch, the driver can select this menu item and proceed to a next node of the menu tree structure. To facilitate this process, menu items are preferably arranged to mimic the arrangement of the function selection switches on the steering wheel 20. It is readily understood that other switch configurations are also within the scope of the present invention.

For illustration purposes, the driver may actuate the upper function selection switch, thereby selecting the audio system. The corresponding node of the menu tree structure is then provided on the display image as shown at 34. Again, the display image provides an indicia for each of the currently selectable menu items. In this way, the driver is able to navigate through a menu of available vehicle subsystem functions that may be controlled by the switch cluster.

Upon reaching a leaf node of the menu tree structure, the function selection switches are then used to control a designated vehicle subsystem function. For example, the driver may select an audio source as shown in the display image labeled 36. The driver selects the radio as the audio source by actuating the upper switch or may select the CD player as the audio source by actuating the lower switch. An indicia of the users selection may be shown in the display image as indicate at 37. When the driver selects the radio, they may then toggle between FM and AM by actuating the upper switch for a second time.

In this exemplary embodiment, the second set of multi-functional switches 24 may be used to control commonly requested vehicle functions. Once the driver selects a particular vehicle subsystem from the root menu, the second set of switches is assigned a dedicated function associated with the vehicle subsystem. For instance, in an audio control mode, two of the switches may be used to increase or decrease the volume; whereas, in the climate control mode, the same two switches may be used to adjust the fan speed. Alternatively, the second set of switches may be assigned functions which correlate to the last vehicle subsystem to be controlled by the driver. In any event, for select commonly controlled parameters, the driver does not need to navigate through the menu structure but can immediately control through the use of the second set of switches.

As another example of a designated vehicle function, the driver may select adjustable equalizer settings as shown in display image 39. The driver selects from the different adjustable equalizer settings by actuating the right switch. In this way, the identified menu items may remain fixed, as actuating the right switch sequences through all of the available equalizer settings. When a desired equalizer setting is shown, the driver may use the second set of multi-functional switches 24 to adjust the equalizer setting that is currently displayed as shown in display image 40. For example, one switch may be used to increase the current equalizer setting, and another switch may be used to decrease the current equalizer setting.

Figure 4:
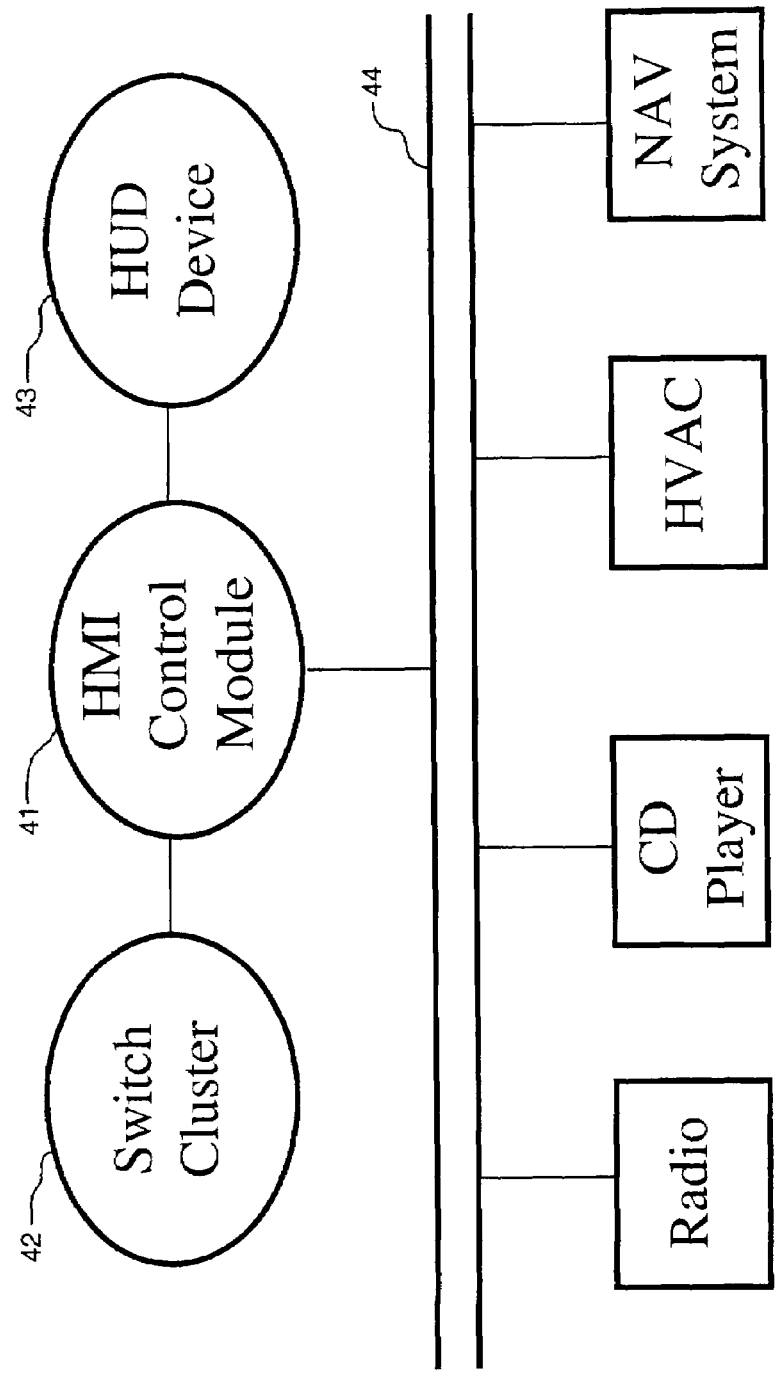
FIG. 4 is a block diagram for the control interface system of the present invention.

Referring to FIG. 4, a control module 41 cooperatively operates with the switch cluster 42 and a display device 43 to effectuate the requested control functions. The control module 41 is adapted to receive control signals from the switches in the switch cluster 42. In response thereto, the control module 41 implements the requested function. As the driver navigates through the menu, the control module 41 communicates with the heads-up display device 43 to change the content of the display image. Upon receiving a request to implement a particular vehicle function, the control module 41 is further operable to pass this request along to the applicable vehicle system. In an exemplary embodiment, the control module 41 sends messages via an internal vehicle network 44 to the applicable vehicle system which implements the message request in a manner known in the art. Sharing information across a vehicle network enables the control interface system of the present invention to be easily integrated with other vehicle subsystems which may be from different manufactures. It is readily understood that the broader aspects of the present invention contemplate other techniques for the control module to initiate a requested function.

Figure 5:
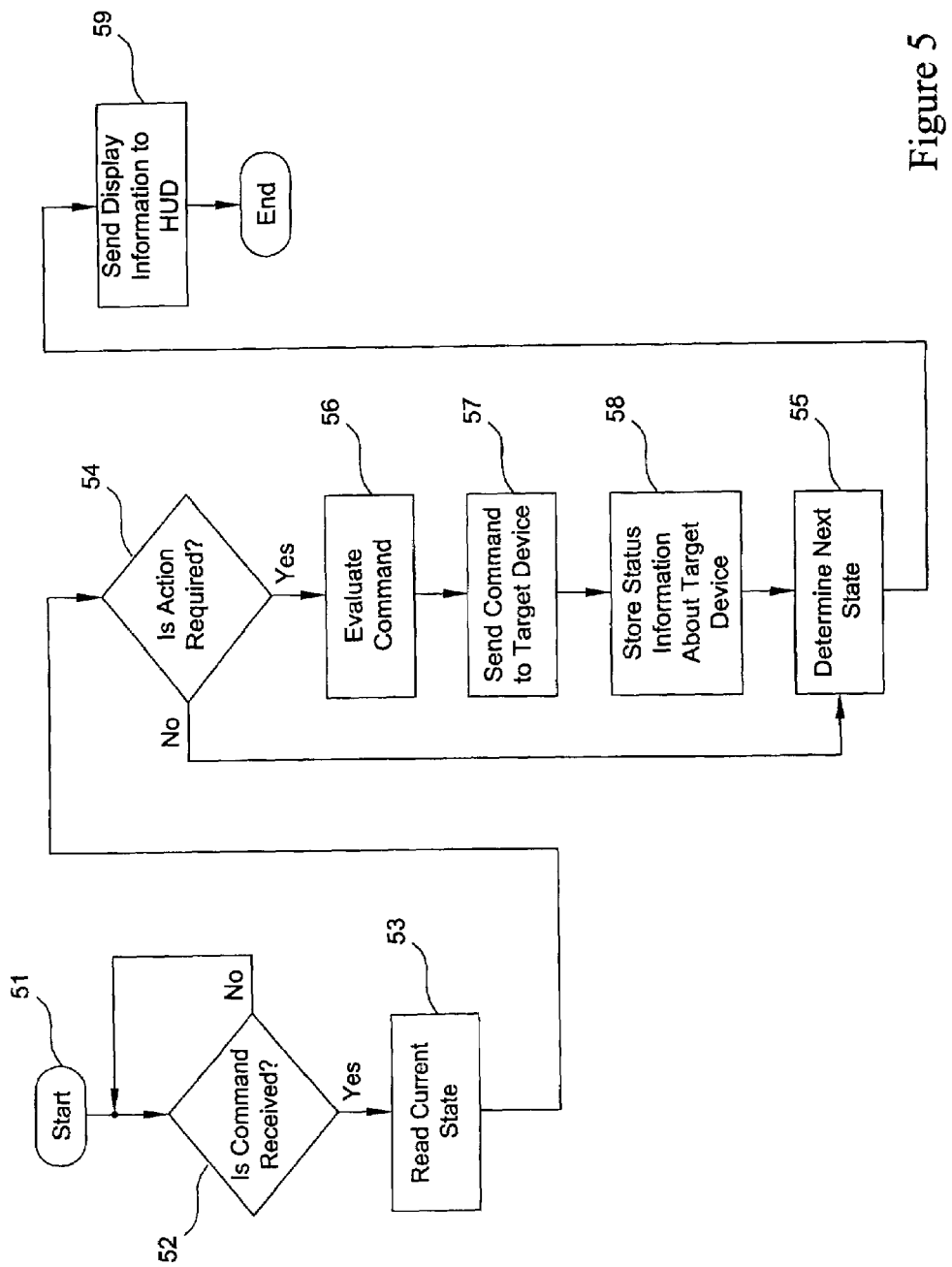
FIG. 5 is a flowchart illustrating steps performed by the control module to process commands received from the exemplary switch configuration.

Referring to FIG. 5, the control module 41 receives commands from the switch cluster 42, processes the commands, and transmits command signals to the appropriate vehicle subsystems. The control module 41 also receives feedback from the vehicle subsystems when the commands requested by the control module 41 are executed by the vehicle subsystems. This enables the control module 41 to effectively display accurate information concerning the current state of the vehicle subsystems to the driver via the heads-up display device 43. An exemplary command processing algorithm begins in step 51. In step 52, the control module 41 determines whether a command was received. If false, control loops to step 52. If true, the control module 41 reads the current state in step 53. For example, the control module 41 simply detects when a switch among the multi-functional switches 24 is actuated.

The actual command associated with the particular switch is dependant on the current state of the control interface system 10. In order to read the current state, the control module 41 requires information about the previous state and the last command that was processed by the control module 41. For example, the control module 41 may employ a hierarchical data structure. In this case, the hierarchical data structure is capable of controlling transitions between states and maintaining information that is required in order to respond to command signals from the switch cluster.

In step 54, the control module 41 determines whether action is required based on the switch that was actuated and based on the current state of the control interface system 10. In other words, the control module 41 determines whether it is necessary to generate a command signal to be transmitted to a vehicle subsystem. For example, as shown in FIG. 3, actuating a switch while an idle display is being generated by the heads-up display device 43 only changes the appearance of the menu items. When the switches are actuated solely to navigate the menu items, the control module 41 is not required to generate a command signal to transmit to a vehicle subsystem.

If action is not required in step 54, control proceeds to step 55. Otherwise, the control module 41 evaluates the current command in step 56. For example, the control module 41 determines which type of action is being commanded based on the current state of the control interface system 10 and the particular switch that was actuated. The control module 41 then generates a command signal based on the type of action that was commanded. In step 57, the control module 41 sends the command signal to the target device.

In an exemplary embodiment, the control module 41 includes a database that instructs the control module 41 as to the required format and/or content of command signals for individual vehicle subsystems. For example, the radio may require a command signal that includes a particular header or that is a certain size. The control module 41 relies on the information in the database to communicate with the vehicle subsystems effectively. Additionally, the database may be updated as vehicle devices are replaced or upgraded so that the control module 41 can continue to operate the vehicle devices. In this way, as long as the control module 41 includes information that is necessary to communicate with applicable vehicle devices, the control interface system 10 is compatible with any existing or future vehicle.

In step 58, the control module 41 optionally stores current status information about the vehicle device to which the control module 41 sends the command signal in step 57. For example, the control module 41 may store the current status of the radio in a register file. The current status of the radio may include the current station that is programmed on the radio tuner. Therefore, if the vehicle is turned off and then back on again, the control module 41 already has the most recently programmed station stored and is capable of immediately initiating display of the station via the heads-up display device 43. This prevents the control module 41 from initiating redundant communication with the vehicle subsystems.

In step 55, the control module 41 determines the next state. The next state is based on the previous command received from the switch cluster 42 as well as the previous state. As described above, if the control module 41 includes a hierarchical data structure, the control module 41 maintains information about responding to command signals, transitioning between states, and displaying associated feedback on the heads-up display device 43. The next state may also be identical to the previous state. For example, changing the volume of the radio via the switch cluster 42 does not change the menu items that are currently displayed by the heads-up display device 43.

In step 59, the control module 41 sends display information to the heads-up display device 43 based on the previous command received from the switch cluster 42 and control ends. For example, the control module 41 may receive a signal from a vehicle device when the vehicle device executes a command transmitted by the control module 41. Therefore, the control module 41 updates the information displayed by the heads-up display device 43 so that the proper menu items are displayed and so that the driver is aware that the command was executed.

Figure 6:
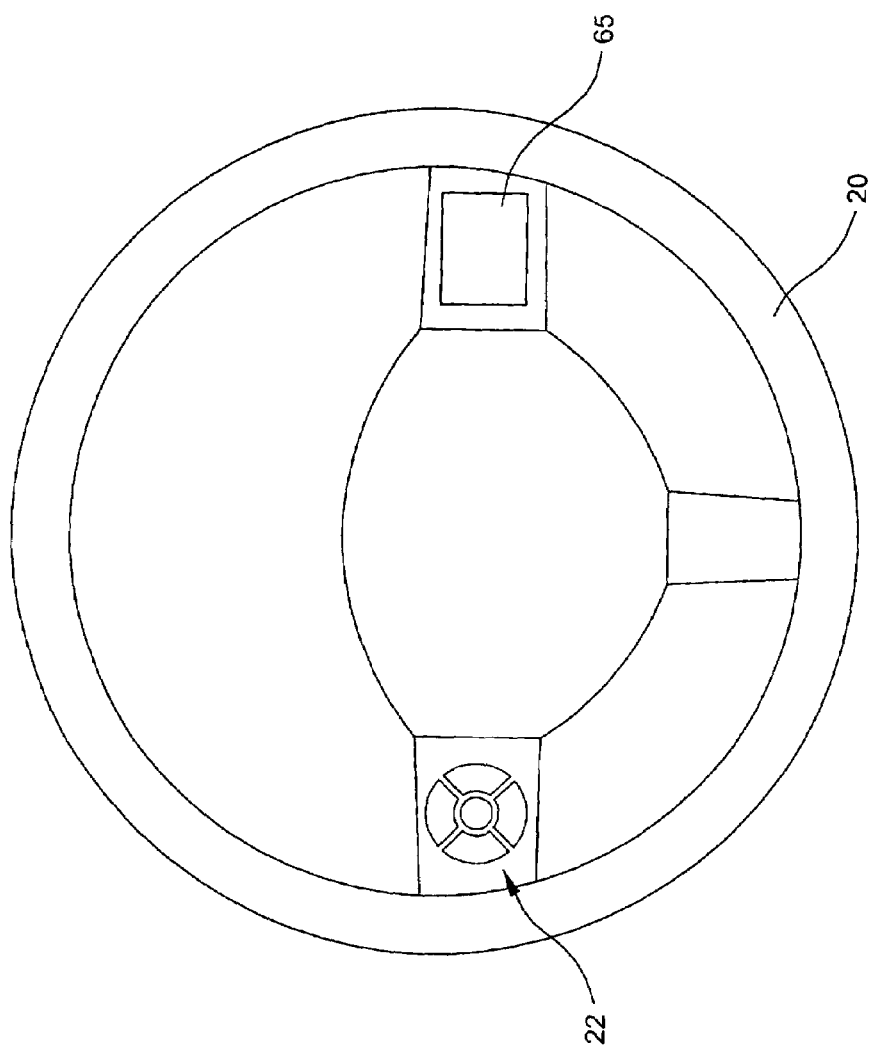
FIG. 6 is a diagram of a steering wheel illustrating an exemplary configuration that includes switches and a touchpad in accordance with the present invention.

In another aspect of the present invention, a touchpad 65 may also be used to control vehicle functions as shown in FIG. 6. In an exemplary embodiment, the touchpad 65 is embedded in the steering wheel 20 in place of the second set of multi-function switches 24. However, the touchpad 65 may also supplement the two switch clusters 22 and 24 described above and/or may be placed in another location proximate to the driver of the vehicle. Further details regarding an exemplary touchpad 65 interface may be found in U.S. Pat. No. 6,819,990 which is incorporated herein by reference.

Figure 7:
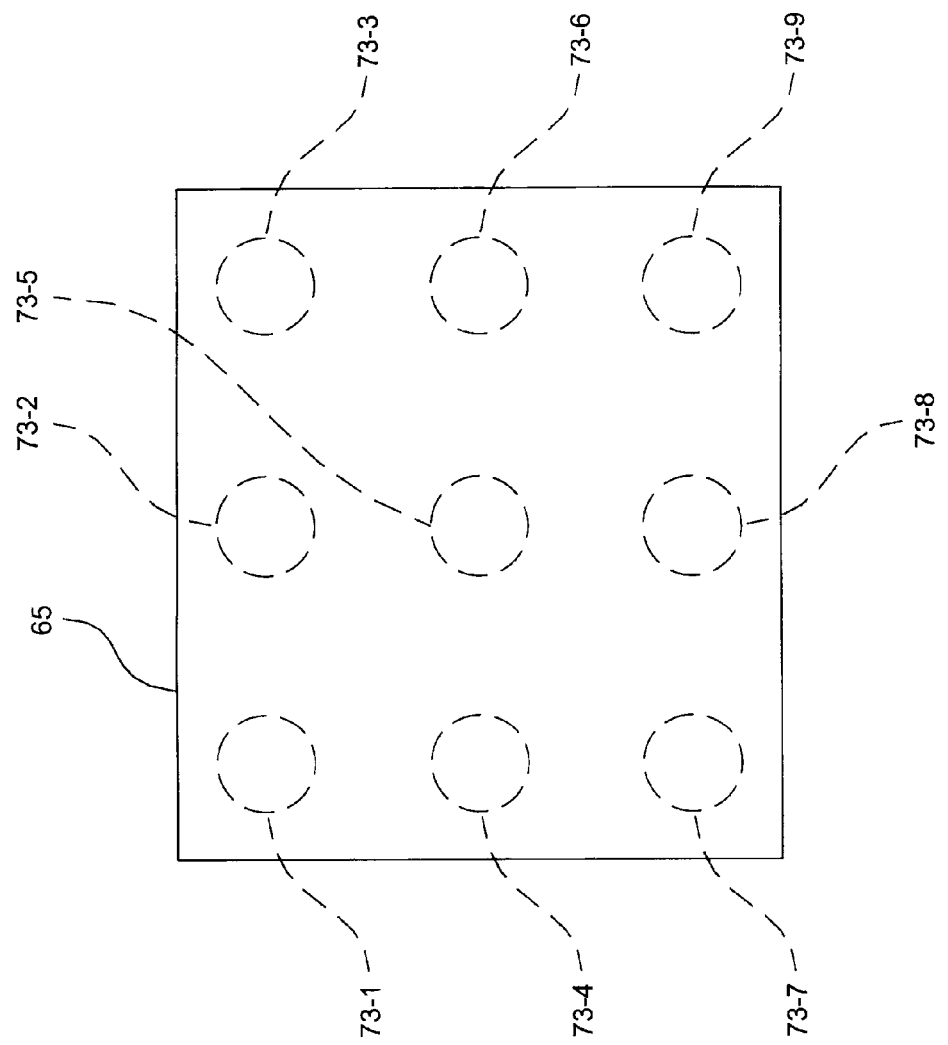
FIG. 7 illustrates an exemplary touchpad that includes predefined touch-sensitive zones capable of initiating a command when actuated by a driver.

Referring to FIG. 7, the touchpad 65 allows the driver to control vehicle devices in unique ways. For example, the driver may use the touchpad 65 in order to control a cursor on a display within the vehicle or on an image that is projected on a display device 43. The touchpad 65 may also include an integrated character recognition algorithm that allows the driver to traces letters, numbers, and/or other symbols on the touchpad 65 in order to control vehicle devices. Alternatively, the character recognition algorithm may be integrated into the system control module 41. An exemplary character recognition algorithm is employed by the "Handwriting Recognition" feature in Microsoft Office XP. The character recognition algorithm or another algorithm may also detect when the driver traces a circular motion on the touchpad 65. The driver may trace a circular motion on the touchpad 65 in order to adjust the volume of the radio, tune a frequency on the radio, and/or scroll though one or more menus that are displayed by the display device 43.

In an exemplary embodiment, the touchpad 65 includes a plurality of touch-sensitive zones 73 as shown in FIG. 7. The touch-sensitive zones 73 are predefined areas of the touchpad 65 that the driver may actuate in order to generate a command for the control module 41. For example, the driver may actuate the touch-sensitive zone 73-5 that is located in the center of the touchpad 65 to confirm entry of a command. The driver may also actuate first and second touch-sensitive zones 73-2 and 73-8, respectively, on the touchpad 65 in order to raise and lower the volume of the radio. Additionally, one or more of the touch-sensitive zones 73 on the touchpad 65 may function analogously with one of the switches in the multi-function switch 22. Functions assigned to each touch-sensitive zone may be dedicated or configurable based on the controlled vehicle subsystem. If configurable, an indicia of the controller function may also be displayed to the user.

Figure 8:
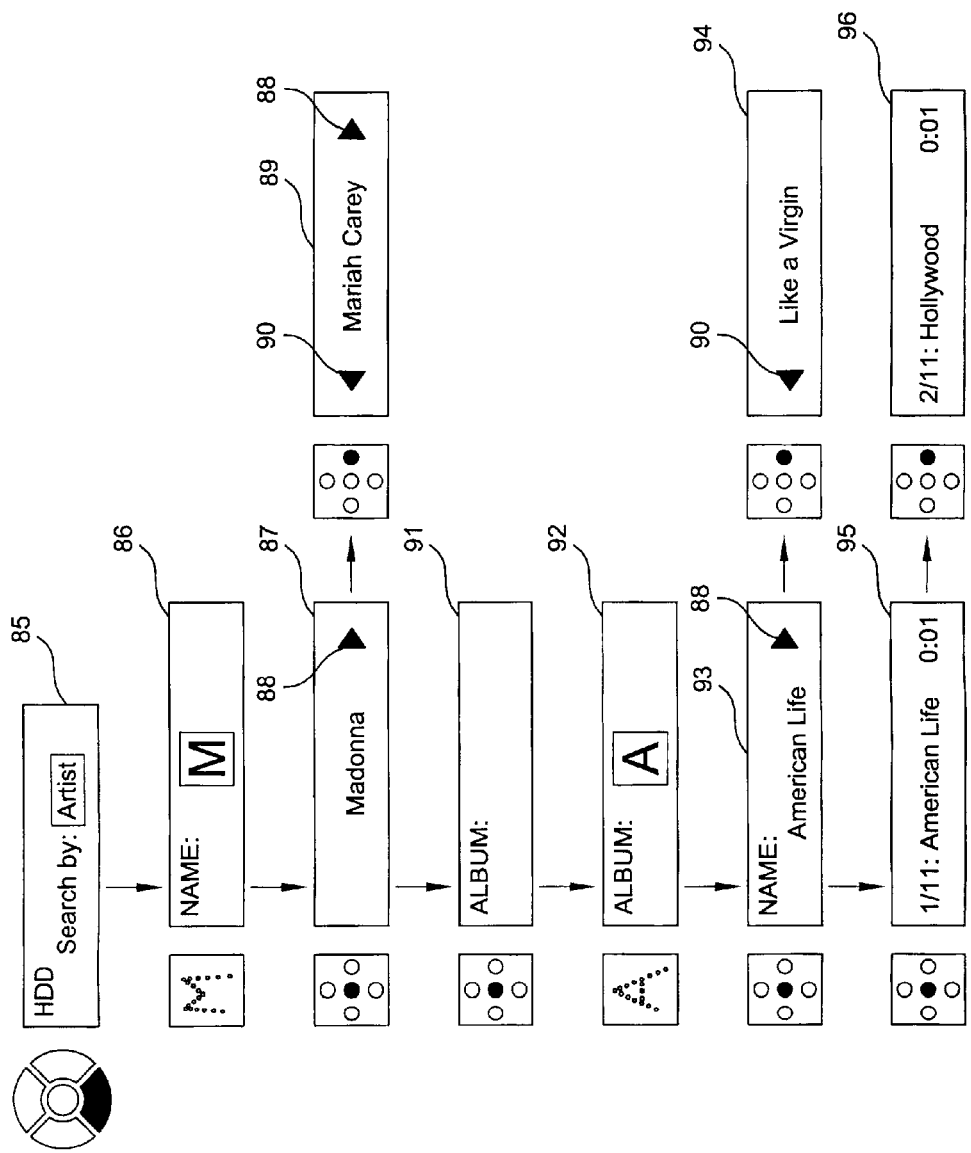
FIG. 8 illustrates exemplary display images as a driver searches for desired music files on a hard disk drive in accordance with the present invention.

Referring to FIG. 8, hard disk drives are being introduced into vehicles as a means for storing a driver's favorite music and movie selections. Hard disk drives may also be used to record programs received via satellite radio such as XM radio. In either case, the hard disk drive may store hundreds or more selections from which the operator may choose. In an exemplary embodiment, the switches of the multi-functional switch 22 control different features of the audio system in the vehicle. For example, a first switch may activate the radio when actuated, and a second switch may activate the CD player when actuated. A third switch may activate the hard disk drive when activated, and a fourth switch may activate a favorite channel/song menu when actuated. Therefore, the functions associated with each of the switches of the multi-functional switch 22 may be fixed or identified solely by the menu item titles displayed by the display device 43. In the event that the functions of the switches are fixed, the switches may be labeled with text indicating the functions.

In an exemplary application, the touchpad 65 facilitates the selection of an audio entry which has been stored on the hard drive device. For example, the operator may trace one or more letters of the name of the desired audio entry onto the touchpad 65. Character recognition algorithms integrated into either the touchpad 65 or the control module 41 are employed to determine the touchpad 65 input. In FIG. 8, the bottom switch of the multi-functional switch 22 selects the hard disk drive feature. Display image 85 shows the associated image generated by the display device 43. The hard disk drive system may default to an artist name search. However, the hard disk drive system may also default to an album name search, a song name search, a playlist name search, a genre search, or a movie title search.

The playlists may include both driver-defined playlists as well as adaptive playlists that are assembled as the hard disk drive is used. For example, the playlists may include a "frequently played" playlist that automatically includes songs from the hard disk drive most frequency played by the driver. In order to change the search method, the driver actuates the bottom button of the multi-functional switch 22 until the desired search method is displayed.

After the artist name search method is selected by the driver, the driver traces a letter on the touchpad 65 with which the name of a desired artist begins. In FIG. 8, the driver traces the letter "M". The character recognition software attempts to detect the letter that was traced by the driver. Display image 86 shows the detected character. The driver actuates the center touch-sensitive zone 73-5 on the touchpad 65 in order to accept the result. In an alternative embodiment, the control module 41 may assume that the letter entered by the driver is correct and automatically proceed based on the detected input. Display window 87 shows the first artist alphabetically beginning with the letter "M" for which a music file stored in the hard disk drive. Display window 87 also includes a right arrow 88, which indicates that additional artist names beginning with the letter "M" are available.

The driver again actuates the center touch-sensitive zone 73-5 on the touchpad 65 in order to confirm the result. Additionally, the driver may actuate the right-side touch-sensitive zone 73-6 on the touchpad 65 to cycle to the next artist name. Display image 89 shows the next artist alphabetically beginning with the letter "M" and also shows both right and left arrows 88 and 90, respectively. The right and left arrows 88 and 90, respectively, indicate that the driver may go back to the previous search result or cycle to the next search result. For example, the driver may actuate the left-side touch-sensitive zone 73-4 on the touchpad 65 in order to cycle back in the search results. Additionally, in the event that the search results for a single letter are too numerous, the driver may trace the second letter included in the word in order to further narrow down the search results. While display images in FIG. 8 generally display only a single line of text, the present invention contemplates displaying a list of search results in the display images.

As shown in display image 91, once the desired artist name is selected, the driver may search for a desired album by the selected artist. In FIG. 8, the driver traces the letter "A". Display image 92 shows that the character recognition algorithm detected the letter "A". The driver actuates the center touch-sensitive zone 73-5 on the touchpad 65 in order to confirm the result. As shown in display image 93, the first available album by the artist Madonna is displayed, and the right arrow 88 indicates that additional results exist. The driver actuates the center touch-sensitive zone 73-5 on the touchpad 65 to confirm the result. Additionally, the driver may actuate the right-side touch-sensitive zone 73-6 on the touchpad 65 to cycle to the next album name as shown in display image 94.

Since the hard disk drive does not include songs from another Madonna album beginning with "A", the next available album alphabetically by Madonna is displayed. Additionally, display image 94 only includes a left arrow 90, as there are no more albums by Madonna stored on the hard disk drive. Therefore, the driver may only cycle backwards in the search results by actuating the left-side touch-sensitive zone 73-4 on the touchpad 65.

As shown in display image 95, once the album name is selected, the first song by track order that is associated with the album begins to play. Display image 95 shows the track number as well as the total number of tracks on the album. Additionally, display image 95 shows the elapsed time on the track. If the driver desires a different song, the driver may actuate the right-side touch-sensitive zone 73-6 in order to advance to the next track. As shown in display image 96, the track number, song name, and elapsed time are displayed.

Figure 9:
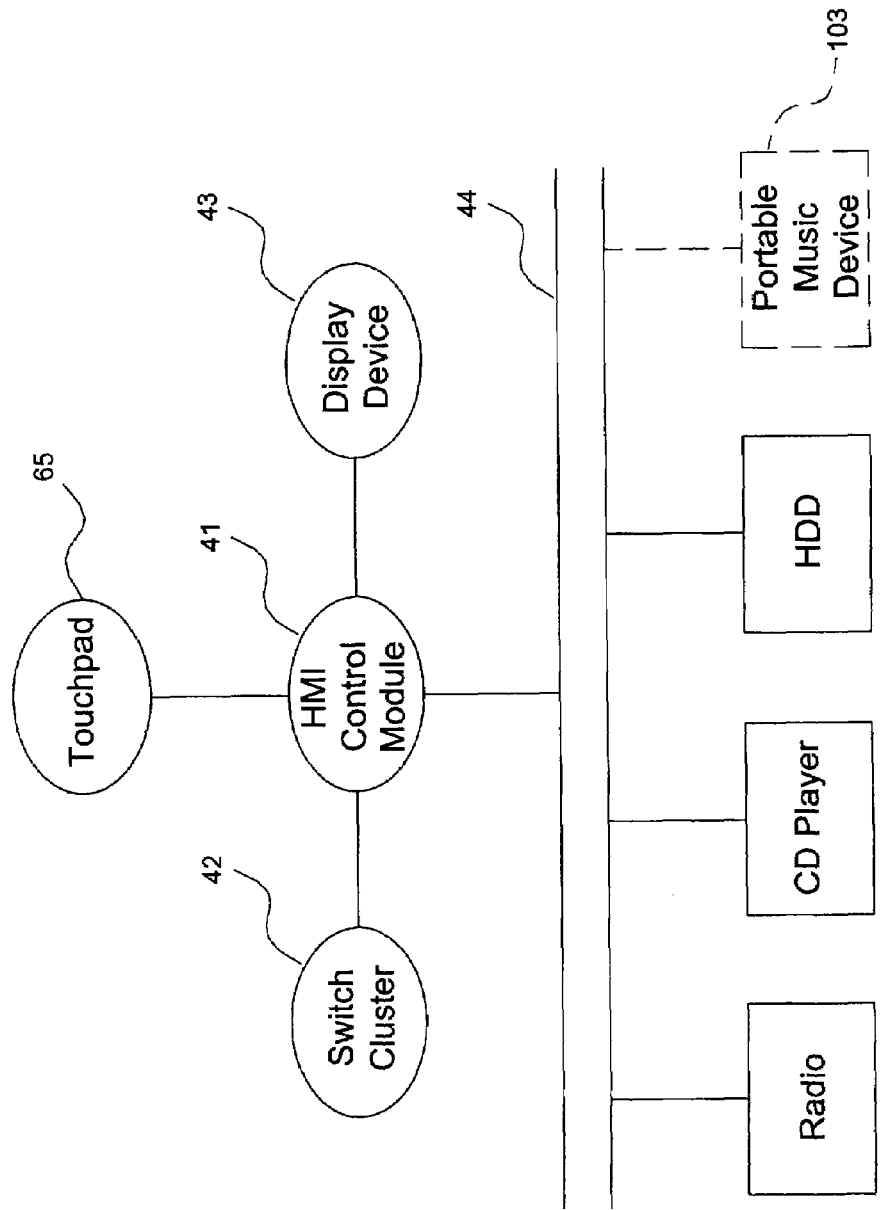
FIG. 9 is a block diagram for a control interface system that includes a touchpad in accordance with the present invention.

Referring to FIG. 9, the control module 41 cooperatively operates with the switch cluster 42, the touchpad 65, and the display device 43 to effectuate requested control functions. The control module 41 is adapted to receive command signals from the switches in the switch cluster 42 and the touchpad 65. The control module 41 implements a requested function based on the received command signal. As the driver makes selections with the switches 42 and/or touchpad 65, the control module 41 updates the content of the display image generated by the heads-up display device 43. Additionally, the control module 41 may transmit a command signal to an applicable vehicle subsystem in response to a command signal from the switch cluster 42 or the touchpad 65. In an exemplary embodiment, the control module 41 transmits command signals to the vehicle systems via the internal network 44. The receiving vehicle device performs the function identified by the command signal.

In addition to the radio, the CD player, and the hard disk drive, FIG. 9 shows a portable music device 103 that is removably connected to the internal network 44. The present invention contemplates control of a portable music device 103 that is analogous to control of the hard disk drive. For example, portable music devices 103 typically index files by artist name, song name, album name, genre, playlist, or other methods of organization. As illustrated in FIG. 8, the driver is capable of quickly and efficiently searching a large database of multimedia content by using the multifunctional-switch 22 and the touchpad 65.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A control interface system for a driver of a vehicle, comprising:
    a touchpad located proximate to the driver of the vehicle and upon driver interaction therewith operable to generate a control signal for a vehicle function;
    a control module adapted to receive the control signal from the touchpad and operable to initiate control of the vehicle function in response thereto;
    a character recognition algorithm integrated with one of the touchpad or the control module, wherein the character recognition algorithm detects a character that is drawn on the touchpad by the driver and the control module controls a vehicle function in response thereto; and
    a display projected into a field of view of the driver and providing an indicia of the vehicle function controlled by the touchpad.

2. The control interface system of claim 1 wherein said touchpad includes at least one embedded switch operable to generate a control signal for a vehicle function upon actuation thereof.

3. The control interface system of claim 1 wherein the control module is in data communication with the display device and operable to initiate a character verification prompt to the driver in response to the character being drawn on the touchpad.

4. The control interface system of claim 3 wherein the control module is operable to initiate a menu search prompt to the driver based on the character that is detected and after the driver verifies the correctness of the detected character.

5. The control interface system of claim 4 wherein the menu search prompt includes a symbol that indicates the presence of a second set of search results that are not currently displayed to the driver in addition to a first set of search results that are currently displayed to the driver.

6. The control interface system of claim 1 wherein the touchpad includes a motion detection algorithm that detects a circular motion that is drawn on the touch pad by the driver and wherein the control module controls a vehicle function in response thereto.

7. The control interface system of claim 1 wherein the control module initiates a change in one of a volume of a radio, a tuning frequency of the radio, or a menu selection in response to the circular motion on the touchpad.

8. The control interface system of claim 1 wherein the touchpad is operable to generate control signals for a plurality of different vehicle functions and the display device provides an indicia for one of the plurality of vehicle functions which is currently controlled by the touchpad.

9. The control interface system of claim 8 wherein the control module is in data communication with the display device and operable to initiate control of the vehicle function as indicated on the display device.

10. The control interface system of claim 8 further comprises at least one multi-functional switch disposed proximate to the driver of the vehicle and operable to select the vehicle function controlled by the multi-functional switch.

11. The control interface system of claim 1 further comprises a switch cluster having a plurality of function selection switches disposed proximate to the driver of the vehicle and operable to navigate a menu of available vehicle functions controlled by the multi-functional switch.

12. The control interface system of claim 11 wherein the display device provides an indicia for menu selections currently selectable via the switch cluster and each of the menu selections correlates to one of the function selection switches in the switch cluster.

13. The control interface system of claim 1 wherein the touchpad is embedded in a steering wheel of the vehicle.

14. The control interface system of claim 10 wherein the multi-functional switch is embedded in a steering device of the vehicle.

15. The control interface system of claim 1 wherein the vehicle function is one of a broadcast radio tuner, a satellite radio tuner, a compact disc player, a vehicle hard disk drive, a portable hard disk player or a navigation system.

* * * * *